United States Patent
Taniguchi et al.

(10) Patent No.: US 6,555,993 B2
(45) Date of Patent: Apr. 29, 2003

(54) VOLTAGE REGULATING SYSTEM OF A VEHICLE AC GENERATOR FOR CHARGING A BATTERY

(75) Inventors: Makoto Taniguchi, Kariya (JP); Toshiyo Ogino, Okazaki (JP); Koji Tanaka, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/960,372

(22) Filed: Sep. 24, 2001

(65) Prior Publication Data

US 2002/0036484 A1 Mar. 28, 2002

(30) Foreign Application Priority Data

Sep. 28, 2000 (JP) .......................................... 2000-297212
May 9, 2001 (JP) .......................................... 2001-139036

(51) Int. Cl.[7] .......................... H02H 7/06; H02P 11/00; H02P 9/00
(52) U.S. Cl. .......................................... 322/28; 322/17
(58) Field of Search .......................................... 322/28, 17

(56) References Cited

U.S. PATENT DOCUMENTS

| | | | |
|---|---|---|---|
| 3,912,108 A | * 10/1975 | Clayton et al. ............ 320/39 |
| 4,143,289 A | 3/1979 | Williams ................. 310/156 |
| 4,471,278 A | * 9/1984 | Matouka ................. 318/561 |
| 4,520,302 A | * 5/1985 | Hill et al. .............. 318/696 |
| 4,590,414 A | * 5/1986 | Mayumi et al. ........... 320/64 |
| 4,707,650 A | * 11/1987 | Bose .................... 318/685 |
| 5,105,143 A | * 4/1992 | Marumoto et al. ......... 322/28 |
| 5,157,321 A | * 10/1992 | Kato et al. .............. 322/28 |
| 5,182,511 A | 1/1993 | Pierret et al. ........ 324/158 MG |
| 5,194,801 A | * 3/1993 | Rozman ................... 322/28 |
| 5,319,299 A | * 6/1994 | Maehara .................. 322/28 |
| 5,376,876 A | 12/1994 | Bauser et al. ............ 322/28 |
| 5,444,354 A | * 8/1995 | Takahashi et al. ......... 322/28 |
| 5,493,202 A | 2/1996 | Iwatani et al. ........... 322/28 |
| 5,581,172 A | * 12/1996 | Iwatani et al. ........... 322/28 |
| 5,602,470 A | 2/1997 | Kohl et al. ............. 324/177 |
| 5,850,138 A | * 12/1998 | Adams et al. ............. 322/68 |
| 6,147,474 A | 11/2000 | Koss et al. .............. 322/59 |
| 6,433,519 B2 | * 8/2002 | Taniguchi et al. ......... 322/28 |
| 6,462,516 B1 | * 10/2002 | Watanabe ................. 322/28 |
| 6,462,517 B2 | * 10/2002 | Asada .................... 322/28 |
| 6,483,277 B1 | * 11/2002 | Harmon ................... 322/28 |
| 6,486,638 B1 | * 11/2002 | Sumimoto et al. .......... 322/28 |
| 6,486,640 B2 | * 11/2002 | Adams .................... 322/59 |

FOREIGN PATENT DOCUMENTS

JP          A-5-83998       4/1993
JP          A-6-284598      10/1994

* cited by examiner

*Primary Examiner*—Tran Nguyen
*Assistant Examiner*—Pedro J. Cuevas
(74) *Attorney, Agent, or Firm*—Posz & Bethards, PLC

(57) ABSTRACT

A voltage regulating system of an AC generator for charging a battery of a nominal voltage includes a rotor having magnetic poles, a field coil, an armature winding, a full-wave rectifier unit connected to the armature winding, a rotation detection unit, a voltage control unit for controlling current supplied to the field coil. The rotation detection unit includes a comparator connected to the armature winding, a first circuit for providing a first threshold voltage that is higher than negative side voltage of the battery and lower than a half of the nominal battery voltage and a second circuit for providing a second threshold voltage that is lower than the nominal voltage and higher than a half of the nominal voltage. The comparator compares the output voltage with one of the first threshold voltage and second threshold voltage. The above structure makes rotation detection accurate and easy even if leak current exist in the armature winding.

10 Claims, 7 Drawing Sheets

FIG. 1

VOLTAGE REGULATING SYSTEM OF A VEHICLE AC GENERATOR FOR CHARGING A BATTERY

CROSS REFERENCE TO RELATED APPLICATION

The present application is based on and claims priority from Japanese Patent Applications 2000-297212, filed Sep. 28, 2000 and 2001-139036, filed May 9, 2001, the contents of which are incorporated herein by reference.

BACKGROUND OF THE INVENTION

1. Field of the Invention

The present invention relates to a voltage regulating system of a vehicle AC generator.

2. Description of the Related Art

It is well known that a vehicle AC generator generates small AC voltage (hereinafter residual-field-voltage) due to residual magnetism, even when field current is not supplied to a field coil as long as a rotor of the AC generator rotates. U.S. Pat. No. 5,376,876 discloses a device for detecting rotation of a rotor by making use of such residual-field voltage. However, if leak current flows into an armature winding from a DC power line of higher potential, the device can not detect such residual-field-voltage correctly.

WO99/07064 proposes another device for detecting the rotation of a rotor. This device uses a window comparator so that the rotation can be detected by changing the threshold value thereof. However it takes considerable time to detect the rotation. JP-A-3-215200, which corresponds to U.S. Pat. No. 5,182,511 and EP0484436, or PCT National Application 8-503308, which corresponds to U.S. Pat. No. 5,602,470 and WO95/05606, discloses a device for detecting the rotation in which a voltage difference between two phase-windings is detected to cancel the influence of the leak current. However, it is necessary to provide another complicated circuit for inputting voltage of two phase-windings to a regulator. Because the device disclosed in JP-A-3-215200 detects the voltage difference between two phase-windings under floating condition, it is difficult to set the reference potential of a comparator.

SUMMARY OF THE INVENTION

Therefore, a main object of the invention is to provide a simple voltage regulating system that can accurately detect the residual-field-voltage without delay so that the rotation of a rotor can be timely and accurately detected.

According to a main feature of the invention, a voltage regulating system of an AC generator for charging a battery includes a rotor having a magnetic poles therewith, a field coil, an armature winding, a full-wave rectifier unit connected to the armature winding, a rotation detection unit, a voltage control unit for controlling current supplied to the field coil. The rotation detection unit includes a comparator connected to the armature winding, a first circuit for providing a first threshold voltage that is higher than negative side voltage of the battery and lower than a half of the nominal battery voltage and a second circuit for providing a second threshold voltage that is lower than the nominal battery voltage and higher than a half of the nominal battery voltage. The comparator compares the output voltage with the first threshold voltage or the second threshold voltage.

Therefore, the rotation detection can be carried out by a simple circuit structure using residual magnetism of the rotor without delay.

According to another feature of the invention, the rotation detection unit includes a clamp switch which clamps the output terminal of the armature winding at a prescribed potential level; and the comparator compares the output voltage with the first threshold voltage when the clamp switch turns on and with said second threshold voltage when the clamp switch turns off.

Therefore, if leak current flows from a high potential portion such as the positive terminal of the rectifier unit, the clamp switch is turned on to discharge the leak current to a ground, thereby suppressing the potential of the output terminal of the armature winding from rising or floating. As a result, residual field voltage induced in the armature winding can be accurately detected, so that the rotation of the rotor can be accurately detected.

According to another feature of the invention, the rotation detection unit includes a clamp switch for clamping the output terminal of the armature winding at a prescribed potential level, a first comparator for comparing the first threshold voltage with the output voltage of the armature winding when the clamp switch both turns on and turns off, and a second comparator for comparing the second threshold voltage with the output voltage of the armature winding when the clamp switch turns on and when the clamp switch turns off.

Therefore, the rotation of the rotor can be detected whether the clamp switch turns on or not, and whether leak current exists or not.

According to another feature of the invention, the voltage regulating system further includes a first resistor, connected in parallel with the clamp switch. The resistor connects the output terminal of the armature winding and a lower-side terminal of the full-wave rectifier unit.

Therefore, the rotation can be detected under stable conditions.

According to another feature of the invention, the voltage regulating system further includes a second resistor connected in series with the clamp switch between the output terminal of the armature winding and a lower-side terminal of the full-wave rectifier unit.

Therefore, the resistor can suppress leak current, so that the clamp switch can be protected. Preferably, the second resistor has a lower resistance than the first resistor.

According to another feature of the invention, the voltage regulating system further includes a circuit for supplying assisting field current for a predetermined assisting period if the output voltage of the armature winding becomes higher than a threshold voltage. Preferably, the circuit for supplying assisting field current intermittently supplies the assisting field current. Moreover, the circuit stops supplying the assisting current after the assisting period for a period longer than the assisting period.

Therefore, the rotation can be detected accurately even at a very low rotation speed without power loss.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 1 is a block diagram illustrating a circuit of a vehicle AC generator that includes a voltage regulating system according to a first embodiment of the invention;

DETAILED DESCRIPTION OF THE PREFERRED EMBODIMENTS

Figure 2:
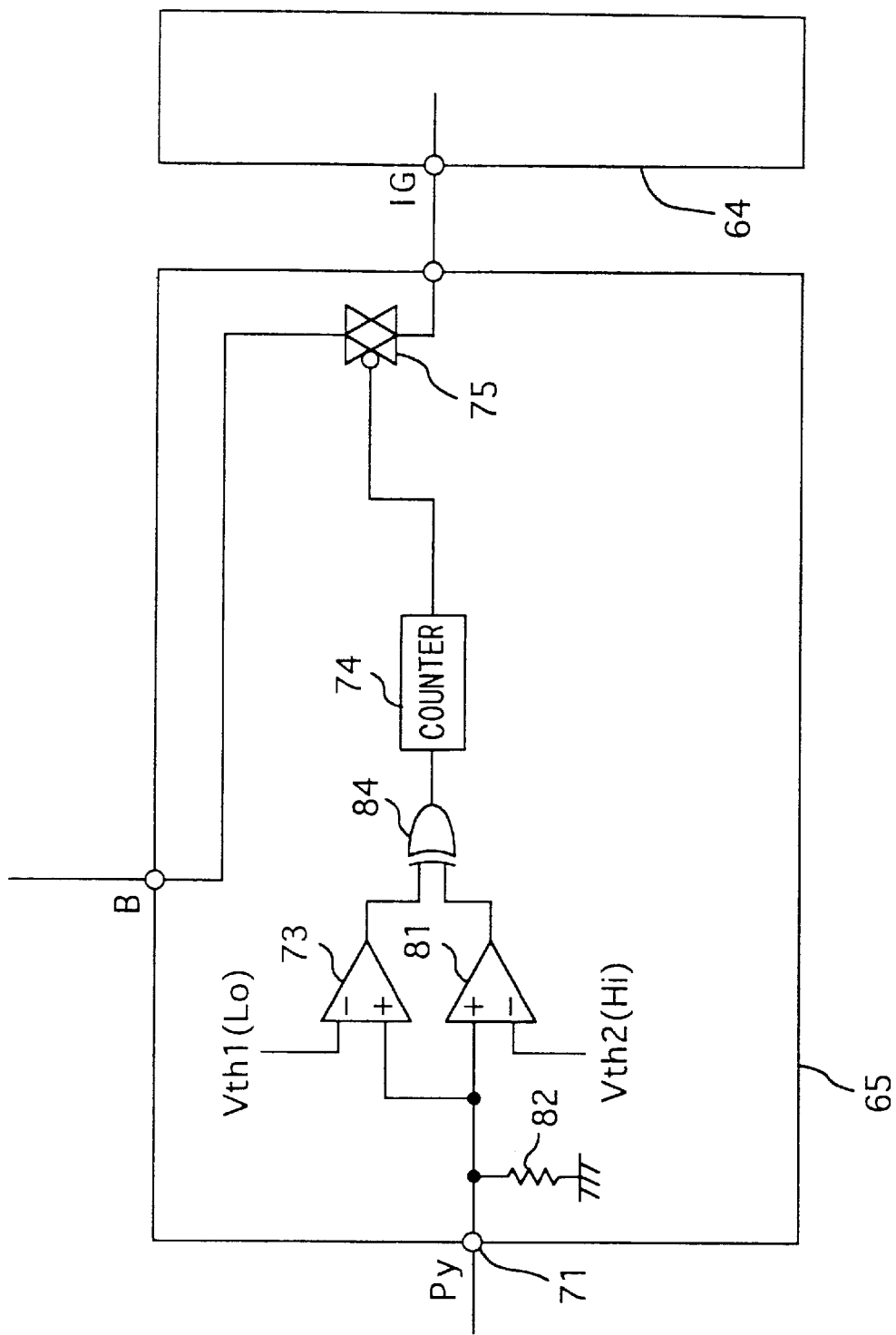
FIG. 2 is a circuit diagram illustrating an auxiliary power source circuit according to the first embodiment.

A voltage regulating system of a vehicle AC generator according to a first embodiment of the invention is described with reference to FIGS. 1 and 2.

Figure 1:
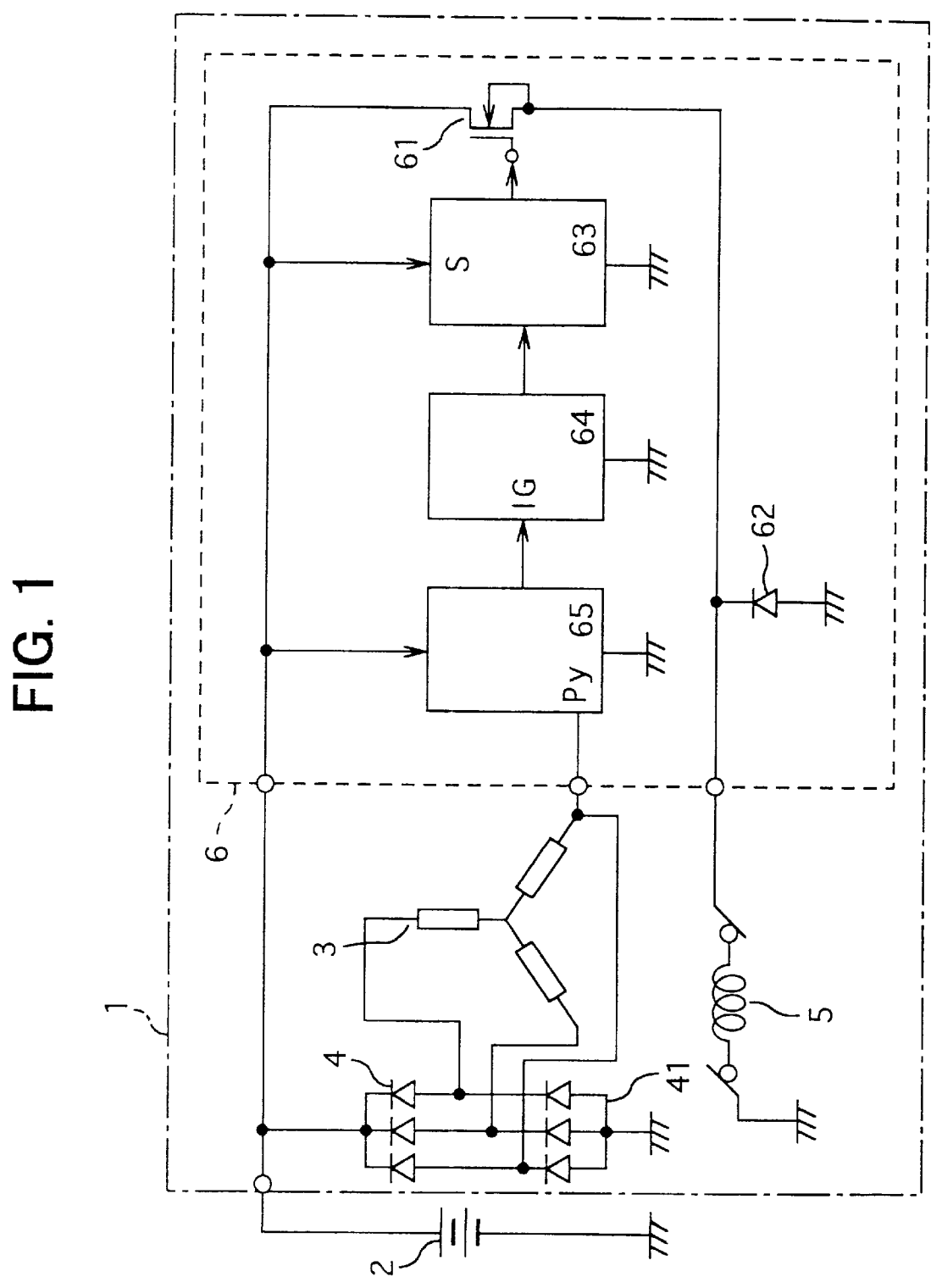

As shown in FIG. 1, a vehicle AC generator or an alternator 1 is connected to a battery 2. The alternator 1 includes a three-phase armature winding 3 mounted on a stator core (not shown), a full-wave rectifier unit 4, a field coil 5 mounted in a rotor (not shown) and a voltage regulating system 6 according to a first embodiment of the invention. The rectifier unit 4 is connected to the armature winding 3 to convert the AC output power thereof to DC output power.

The voltage regulating system 6 includes a higher side switching power transistor 61, a flywheel diode 62, a voltage control circuit 63, a main power supply circuit 64 and an auxiliary power supply circuit 65. The flywheel diode 62 is connected between the field coil 5 and a ground to pass field current when the power transistor 61 is turned off. The voltage control circuit 63 is connected to the output terminal of the rectifier unit 4 to control the DC output voltage of the rectifier unit 4 in a prescribed voltage range in a well-known manner. The main power supply circuit 64 supplies electric power to the voltage control circuit 63. The auxiliary power supply circuit 65 is connected to a Y-phase winding of the three-phase armature winding 3 to detect rotation of the rotor from Y-phase voltage Py and provide a drive signal for driving the main power supply circuit 64.

As illustrated in FIG. 2, the auxiliary power supply circuit 65 includes an input terminal 71, a resistor 82 having a resistance of several kΩ, comparators 73 and 81, an exclusive OR circuit 84, a counter 74 and an analog switch 75.

The comparator 73 has an inverted input terminal to which first threshold voltage Vth1 is applied, and the comparator 81 has an inverted terminal to which second threshold voltage Vth2 is applied. The other non-inverted terminals of the comparators 73 and 81 are connected to the Y-phase winding of the armature winding 3 so that Y-phase voltage can be applied thereto. The first threshold voltage Vth1 is higher than the negative side potential of the battery 2 and lower than a half of a nominal battery voltage, and the second threshold voltage Vth2 is lower than the nominal battery voltage and higher than a half of the nominal battery voltage.

The output signals of the comparators 73 and 81 are sent to the counter 74 through the exclusive OR circuit 84. The analog switch 75 turns on or off a power supply line from the battery 2 through a terminal B to the main power supply circuit 64 in response to the output signal of the counter 74.

If there is no leak current, the comparator 73 provides a high level signal each time the potential of the input terminal 71 of the auxiliary power source circuit 65 becomes higher than the first threshold voltage Vth1.

If leak current of an amount between several milli-amperes and tens of milli-amperes flows into the input terminal 71, the potential of the input terminal 71 is raised to be as high as the potential of the positive side terminal of the battery 2 by the voltage drop across the resistor 82. If the rotor rotates, the potential of the input terminal 71 cyclically lowers from the potential, which is as high as the positive side potential of the battery 2. Accordingly, the comparator 81 provides a low level signal each time the input terminal potential becomes lower than the second threshold voltage Vth2. Thus, the comparators 73 and 81 provide pulse signals indicative of whether leak current flows or not.

The pulse signals are sent to the counter 74 through the exclusive OR circuit 84 to drive the analog switch 75 to intermittently supply electric power to the main power supply circuit 64.

The counter 74 includes a digital comparator (not shown). If a digital output value of the counter 74 is larger than a preset rotation value of the digital comparator, the digital comparator provides the analog switch 75 with a high level signal to turn on.

A voltage regulating system according to a second embodiment of the invention is described with reference to FIG. 3. This voltage regulating system includes the same components as the first embodiment except for the auxiliary power supply circuit 165 illustrated in FIG. 3. In the meantime, the same reference numeral as the first embodiment corresponds to the same or substantially the same component or part, hereafter.

The auxiliary power supply circuit 165 includes the same input terminal 71 as that of the first embodiment, a threshold voltage supplying circuit 72, a first comparator 73, a counter 74, an analog switch 75, a clamp switch 76, a peak voltage detector 77, a second comparator 78, a timer 79 and an inverter 80.

The input terminal 71 is connected to the Y-phase winding of the armature 3. The threshold voltage supplying circuit 72 is comprised of voltage dividing resistors Ra, Rb and Rc, an analog switch 721 and a diode 722. The diode 722 prevents short-circuiting of the resistor Rb when the analog switch 721 turns on.

The threshold voltage supplying circuit 72 provides first and second threshold voltages. The first threshold voltage Vth1 is lower than a half the nominal battery voltage of the battery 2, and the second threshold voltage Vth2 is higher than a half the nominal battery voltage. When the analog switch 721 turns on, it provides the inverted terminal of the first comparator 73 with the second threshold voltage Vth2. When the analog switch 721 turns off, it provides the same terminal of the first comparator 73 with the first threshold voltage Vth1. The Y-phase voltage Py is applied to the non-inverted terminal of the first comparator 73.

The clamp switch 76, which has a preset on-resistance that is a resistance when the clamp switch turns on, grounds the Y-phase winding. The peak detector 77 detects the peak value of the Y-phase voltage Py. The second comparator 78 compares the Y-phase voltage Py with a reference voltage Vref. The timer 79 starts when the output signal of the second comparator 78 changes to turn on the clamp switch 76 and turn off the analog switch 721.

When the comparator 78 detects that the peak of the Y-phase voltage Py becomes higher than the reference voltage Vref, the timer 79 turns on the clamp switch 76 for a preset clamp period (e.g. hundreds msec) and turns off the analog switch 721 to provide the inverted terminal of the first comparator 73 with the first threshold voltage (i.e. low level voltage) Vth1.

After the clamp period is over, the timer 79 turns off the clamp switch 76 and turns on the analog switch 721 to provide the inverted terminal of the comparator 73 with the second threshold voltage (i.e. high level voltage) Vth2, for an unclamped period.

If there is no leak current, the clamp switch 76 turns on when the rotor rotates and the Y-phase voltage Py becomes higher than the reference voltage Vref. The analog switch 721 turns off during the clamp period, and the first threshold voltage Vth1 is applied to the inverted terminal of the first comparator 73, so that the first comparator 73 provides the high level signal each time the Y-phase voltage Py becomes highr than the first threshold voltage Vth1. Thus, the rotation of the rotor is detected.

If leak current flows into the input terminal 71, the leak current flows to the ground through the clamp switch 76, and the mean value of the potential of the input terminal 71 becomes as high as the product of an amount of the leak current and the on-resistance of the clamp switch 76. If the leak current is small and the on-resistance of the clamp switch 76 is small, the mean value is small, or preferably, smaller than a half the first threshold voltage.

When the rotor does not rotate, the first comparator 73 detects a low level signal which means that the rotor stops. In other words, if the rotor stops and small leak current flows into the input terminal 71, the clamp switch 76 turns on to clamp the potential of the input terminal at a low level. Therefore, the first comparator does not change the output signal so that erroneous detection of the rotation can be prevented.

If the rotor rotates, the residual field voltage, as the Y-phase voltage Py, is applied to the input terminal 71. If the rotation speed increases, the Y-phase voltage Py becomes higher than the first threshold voltage Vth1. Accordingly, the first comparator 73 provides pulse signals whose frequency is proportional to the rotation speed. Thus the comparator 73 detects the rotation of the rotor whether leak current flows into the armature winding 3 or not.

The leak current flows from a portion of the higher potential to the ground through a portion of the armature winding 3 and the clamp switch 76 that turns on. Because the resistance of the leak passage between the portion of the higher potential and the armature winding 3 is much larger than the on-resistance of the clamp switch 76 that turns on, an amount of the leak current is not increased when the clamp switch 76 turns on. Accordingly, there is less voltage drop across the clamp switch 76 than the first threshold voltage Vth1, so that the rotation of the rotor can be correctly detected.

After the timer 79 turns on the clamp switch 76 for a while (e.g. several hundred seconds), the auxiliary power supply circuit 65 turns off the clamp switch and, at the same time, turns on the analog switch 721 via the inverter 80 to set the threshold voltage of the first comparator 73 at the second threshold voltage (high level signal) Vth2.

If leak current that has been flowing into the armature winding 3 through the clamp switch 76 is interrupted, electric charges are accumulated at the input terminal 71 so that the potential of the input terminal 71 increases to approximately the same level as the battery voltage.

If the rotor rotates and the residual field voltage is generated, the Y-phase voltage Py oscillates up and down from the battery voltage as the center of the Y-phase voltage Py. Therefore, the residual field voltage cyclically crosses the second threshold voltage Vth2, so that the first comparator 73 can detect the rotation. When the rotor does not rotate, the potential of the Y-phase voltage Py remains high. Accordingly, the first comparator 73 does not erroneously detect the rotation of the rotor.

Figure 4:
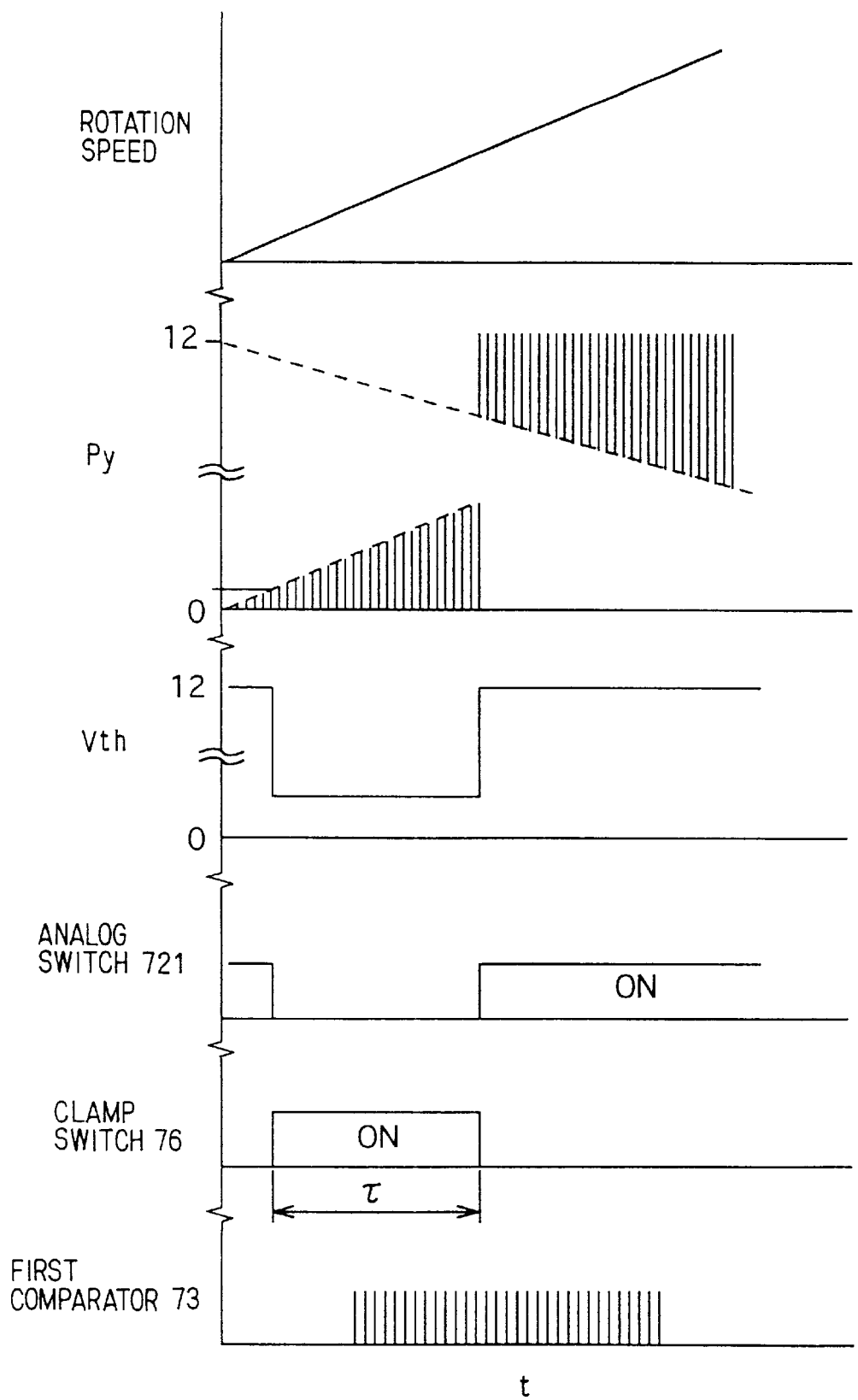
FIG. 4 is a timing chart illustrating operation of the auxiliary power source circuit according to the second embodiment.

The operation timing charts of various portions of the above auxiliary power supply circuit 165 are illustrated in FIG. 4.

The voltage regulating system according to the second embodiment of the invention need not a transmission wire for detecting operation of the ignition key switch.

The peak detector 77 can be substituted by a circuit for detecting mean values of the potential of the input terminal 71. If the input terminal 71 is connected to the non-inverted terminal of the second comparator 78, the peak detector 77 can be omitted.

If an astable multivibrator is used for the timer 79 to provide a long on-period (several hundred seconds) T, the rotation detection can be carried out alternately by the first threshold voltage Vth1 and by the second threshold voltage Vth2. Therefore, the second comparator 78 can be omitted. In this case, the on-period during which the clamp switch 76 is turned on can be set shorter than the off-period during which the clamp switch 76 is turned off, so as to reduce energy loss of the output power due to the resistance of the clamp switch 76.

Figure 5:
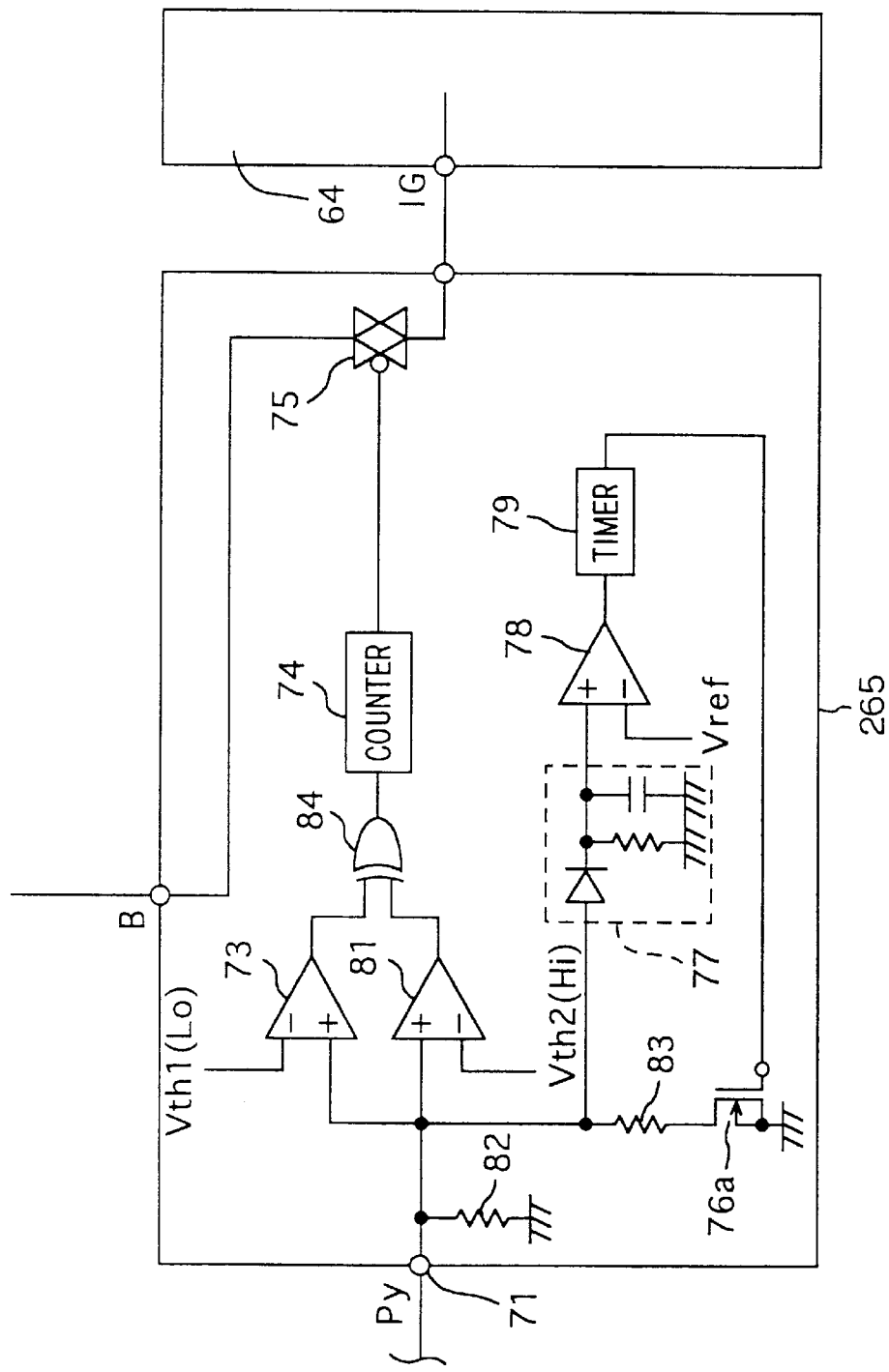
FIG. 5 is a circuit diagram illustrating an auxiliary power source circuit according to a third embodiment of the invention.

A voltage regulating system according to a third embodiment of the invention is described with reference to FIG. 5. An auxiliary power supply circuit 265 includes substantially the same circuit section as the auxiliary power supply circuit 65 of the voltage regulating system according to the first embodiment and the other circuit section that is similar to the corresponding circuit section of the second embodiment. Therefore, the operation of the same circuit section is the same as the operation of the auxiliary power supply circuit 65 of the voltage regulating system according to the first embodiment. The clamp switch 76 of the second embodiment is substituted by a series circuit of a clamp switch 76a and a resistor 83 in the other circuit section. The parallel resistor 82 bypasses very small leak current to the ground to prevent the potential of the input terminal 71 from rising. In other words, very small leak current is neglected by the parallel resistor 82.

If the leak current does not exist, the comparator 73 provides the high level signal each time the potential of the input terminal 71 becomes higher than the first threshold voltage Vth1. Therefore, the rotation of the rotor can be detected.

If the leak current flows into the input terminal 71, the leak current flows through the clamp switch 76 to the ground. Accordingly, the mean value of the potential of the input terminal 71 becomes as high as the product of the amount of the leak current and the resistance of the resistor 83. Therefore, if the leak current is small, the potential of the input terminal is small or less than a half of the first threshold voltage Vth1.

If the rotor stops, the comparator 73 detects a low level signal (that means no rotation). In other words, if leak current flows into the input terminal 71 while the rotor does not rotate, the first comparator 73 does not turn over the output signal thereof. This prevents erroneous detection of the rotation. On the other hand, if the rotor rotates, the residual field voltage is applied to the input terminal 71. The residual field voltage or the Y-phase voltage Py crosses the first threshold voltage Vth1 if the rotation speed increases. Therefore, the first comparator 73 provides pulse signals whose frequency is proportional to the rotation speed. Thus the first comparator 73 detects the rotation whether leak current exists or not.

During the clamping period, the comparator 81 provides a low level output signal because the second threshold voltage Vth2 is high. Therefore, the exclusive OR circuit 84 provides a high level signal only when the comparator 81 provides a high level signal.

During the non-clamping period, the comparator 73 can not detect the rotation if leak current exists because the potential of the input terminal becomes high. However, the comparator 81 detects the rotation each time the potential of the input terminal 71 crosses the second threshold voltage Vth2. On the other hand, the comparator 81 does not provide the pulse signal if the rotor does not rotate. Thus, the comparator 81 can detect the rotation.

In summary, one of the comparators 73 and 81 provides pulse signals and the other provides the high level signal, whether during the clamping period or during non-clamping period and whether there is leak current or not. As a result the exclusive OR circuit 84 provides pulse signals during the rotation.

It is preferable that the clamping period is shorter than the non-clamping period, in order to minimize the power loss after the generator 1 starts generation. In order to further reduce the power loss, it is possible to turn off the clamp switch 76a when the output power of the generator 1 is higher than a predetermined level.

As a variation of the third embodiment, field current is supplied to the field coil in response to the output signal of the peak detector 77 while the clamp switch 76a turns on for a certain period, in order to increase the sensitivity of the rotation detection.

In this case, it is preferable to interrupt the field current for a longer period after the certain period. Otherwise, the second comparator 78 may turn over the output signal thereof to supply the field current to the field coil if the potential of the input terminal 71 is raised by leak current while the rotor does not rotate.

Figure 6:
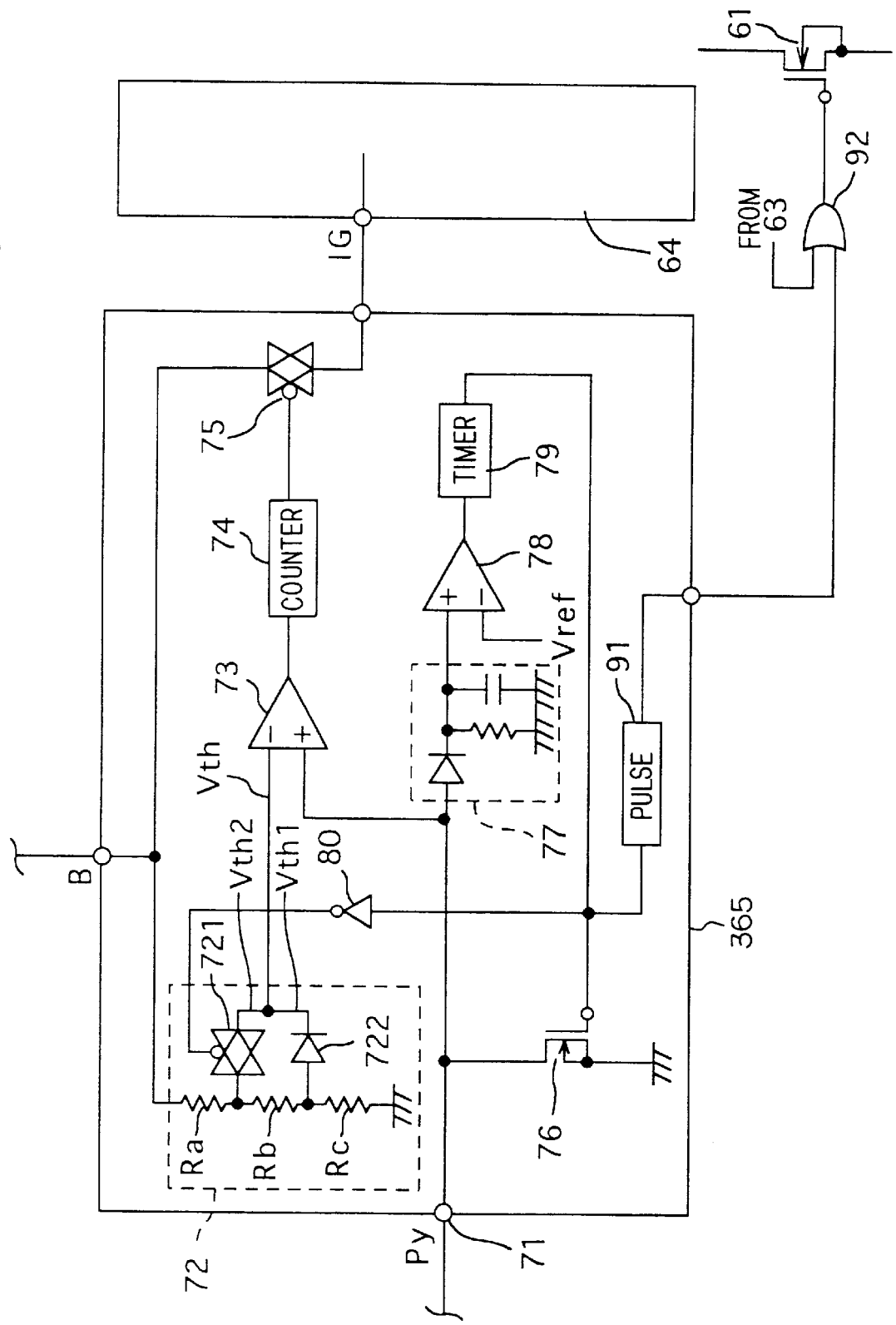
FIG. 6 is a circuit diagram illustrating an auxiliary power source circuit according to a fourth embodiment of the invention.

A voltage regulating system according to a fourth embodiment of the invention is described with reference to FIG. 6. An auxiliary power supply circuit 365 is slightly different from the voltage regulating system according to the second embodiment.

Figure 3:
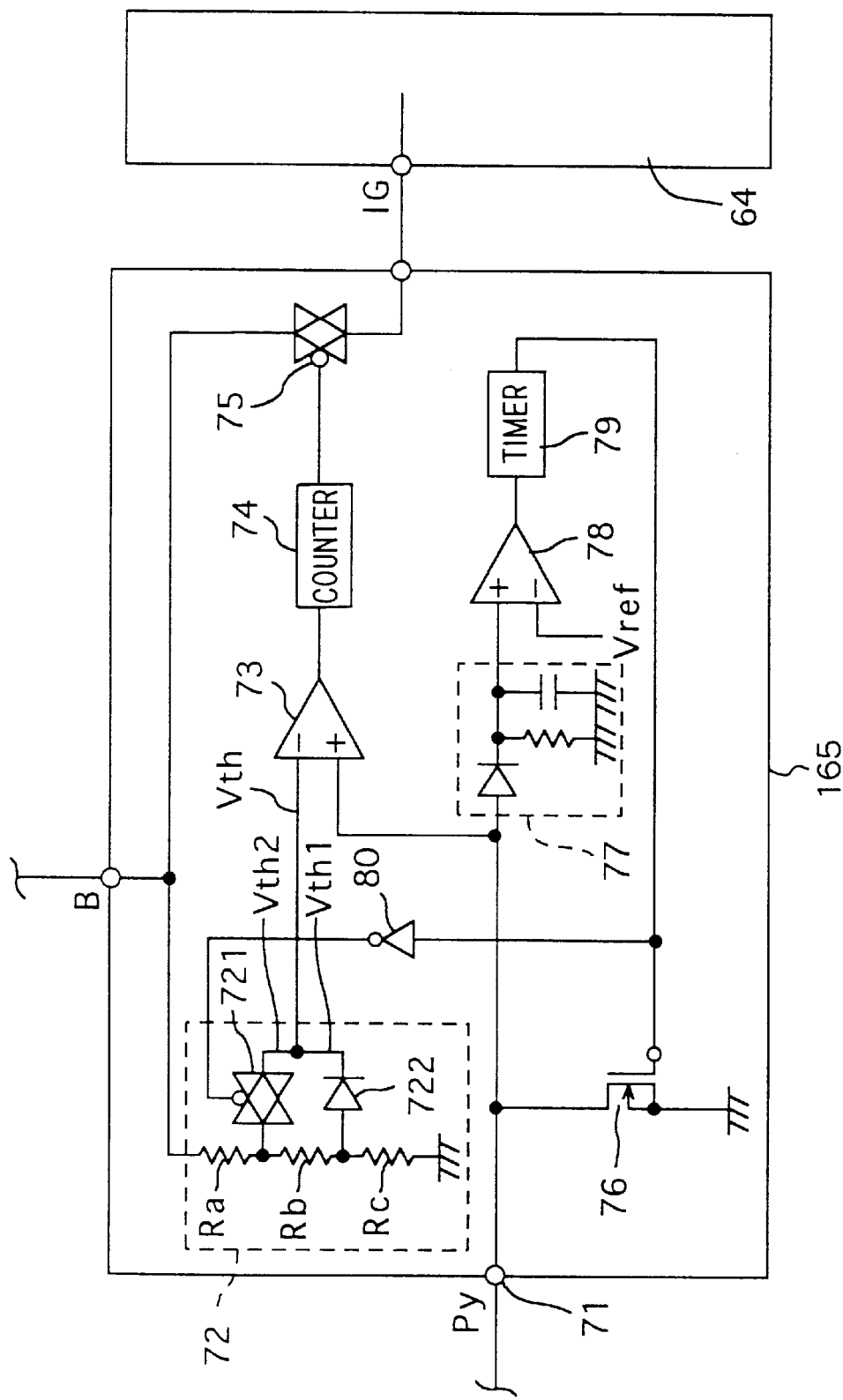
FIG. 3 is a circuit diagram illustrating an auxiliary power source circuit according to a second embodiment of the invention.

The auxiliary power supply circuit 365 is almost the same as the auxiliary power supply circuit 165 shown in FIG. 3 except that the former has a pulse generation circuit 91 and an OR circuit 92 additionally.

When the comparator 78 temporarily detects the rotation and the timer 79 turns on the clamp switch 76 for a certain period, the pulse generation circuit 91 provides pulse voltage signals having a suitable duty ratio, which are applied to the power transistor 61 through the OR circuit 92 to supply the field current at the suitable duty ratio. Thus, when the rotation is temporarily detected, assisting field current is supplied to the field coil 5 to increase accuracy of the rotation detection.

Figure 7:
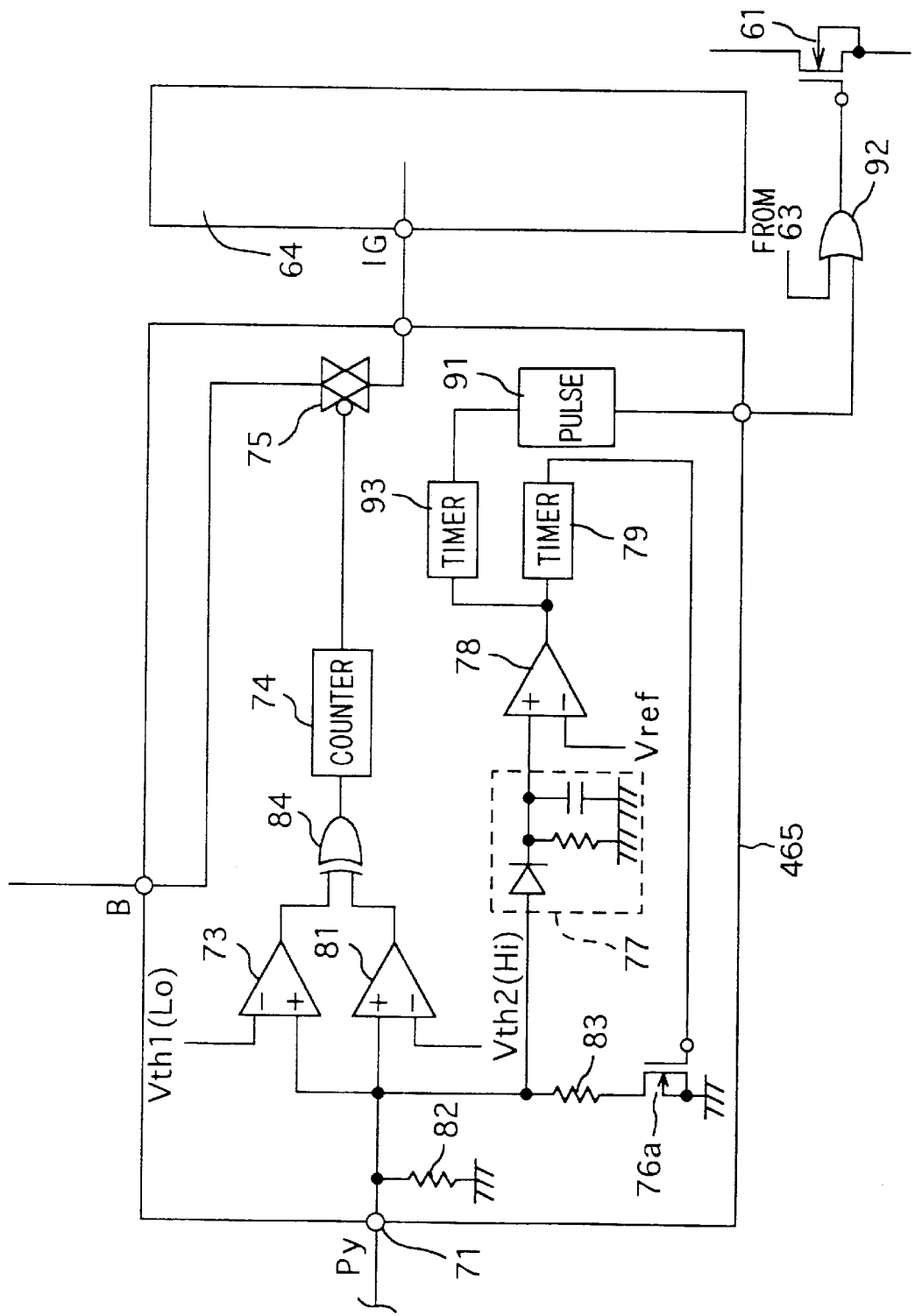
FIG. 7 is a circuit diagram illustrating an auxiliary power source circuit according to a fifth embodiment of the invention.

A voltage regulating system according to a fifth embodiment of the invention is described with reference to FIG. 7. This voltage regulating system has a different auxiliary power supply circuit 465, which is almost the same as the auxiliary power supply circuit 265 shown in FIG. 5 except for additional series circuit including a second timer 93, a pulse generation circuit 91 and an OR circuit 92.

When the comparator 78 temporarily detects the rotation, the pulse generation circuit 91 provides pulse voltage signals having a suitable duty ratio, which are applied to the power transistor 61 through the OR circuit 92 to supply the field current at the suitable duty ratio. Thus, when the rotation is temporarily detected, assisting field current is supplied to the field coil 5 to increase accuracy of the rotation detection, for a period longer than the period during which the first timer 79 turns on the clamp switch 76a.

In summary, the comparator 73 detects the rotation when the clamp switch 76a turns on and the assisting current is supplied, and the comparator 81 detects the rotation when the clamp switch 76a turns off and the assisting current is supplied. Although the assisting current is supplied even if an amount of the leak current is not small, power loss is not so large because the supplying period is very short.

It is preferable to provide the timer circuit 93 with a function to interrupt the assisting field current after the assisting period during which the assisting current is supplied for a longer period than the assisting period.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A voltage regulating system for charging a battery of a nominal voltage comprising:
   a rotor having a magnetic poles therewith, a field coil, an armature winding having a plurality of output terminals for providing multi-phase output voltage, a full-wave rectifier unit connected to said plurality of output terminals, a rotation detection unit, a voltage control unit for controlling current supplied to said field coil, wherein
   said rotation detection unit comprises a comparator connected to one of said plurality of output terminals, a first means for providing a first threshold voltage that is higher than negative side voltage of said battery and lower than a half of said nominal voltage and a second means for providing a second threshold voltage that is lower than said nominal voltage and higher than said half of said nominal voltage, and
   said comparator compares voltage of said one of said plurality of output terminals generated while no current is supplied to said field coil with one of said first threshold voltage and second threshold voltage.

2. The voltage regulating system as claimed in claim 1, wherein said rotation detection unit comprises a clamp switch for clamping said voltage of said one of said plurality of output terminals at a prescribed potential level; and wherein
   said comparator compares said voltage of said one of said plurality of output terminals with said first threshold voltage when said clamp switch turns on and with said second threshold voltage when said clamp switch turns off.

3. The voltage regulating system as claimed in claim 1, wherein
   said rotation detection unit comprises:
   a clamp switch for clamping said voltage of said one of said plurality of output terminals at a prescribed potential level;

a first comparator for comparing said first threshold voltage with said voltage of said one of said plurality of output terminals when said clamp switch turns on and when said clamp switch turns off; and a second comparator for comparing said second threshold voltage with said voltage of said one of said plurality of output terminals when said clamp switch turns on and when said clamp switch turns off.

4. A voltage regulating system for charging a battery of a nominal voltage comprising:

a rotor having a magnetic poles therewith, a field coil, an armature winding having a plurality of output terminals for providing multi-phase output voltage, a full-wave rectifier unit connected to said plurality of output terminals, a voltage control unit for controlling current supplied to said field coil, and a rotation detection unit comprising a comparator connected to one of said plurality of output terminals, a first means for providing a first threshold voltage that is higher than negative side voltage of said battery and lower than a half of said nominal voltage and a second means for providing a second threshold voltage that is lower than said nominal voltage and higher than said half of said nominal voltage, said comparator compares voltage of said one of said plurality of output terminals generated while no current is supplied to said field coil with one of said first threshold voltage and second threshold voltage, said rotation detection unit further comprises a clamp switch for clamping voltage of said one of said plurality of output terminals at a prescribed potential level, and said comparator compares said voltage of said one of said plurality of output terminals with said first threshold voltage when said clamp switch turns on and with said second threshold voltage when said clamp switch turns off, said rotor further including a resistor, connected in parallel with said clamp switch, for connecting said one of said plurality of output terminals and a lower-side terminal of said full-wave rectifier unit.

5. A voltage regulating system for charging a battery of a nominal voltage comprising:

a rotor having a magnetic poles therewith, a field coil, an armature winding having a plurality of output terminals for providing multi-phase output voltage, a full-wave rectifier unit connected to said plurality of output terminals, a voltage control unit for controlling current supplied to said field coil, and a rotation detection unit comprising a comparator connected to one of said plurality of output terminals, a first means for providing a first threshold voltage that is higher than negative side voltage of said battery and lower than a half of said nominal voltage and a second means for providing a second threshold voltage that is lower than said nominal voltage and higher than said half of said nominal voltage, said comparator compares voltage of said one of said plurality of output terminals generated while no current is supplied to said field coil with one of said first threshold voltage and second threshold voltage, said rotation detection unit further comprises a clamp switch for clamping voltage of said one of said plurality of output terminals at a prescribed potential level, and said comparator compares said voltage of said one of said plurality of output terminals with said first threshold voltage when said clamp switch turns on and with said second threshold voltage when said clamp switch turns off, said rotor further having a resistor connected in series with said clamp switch between said one of said plurality of output terminals and a lower-side terminal of said full-wave rectifier unit.

6. The voltage regulating system as claimed in claim 1, further comprising means for supplying assisting field current for a predetermined assisting period if said output voltage of said armature winding becomes higher than a threshold voltage.

7. The voltage regulating system as claimed in claim 6, wherein said means for supplying assisting field current intermittently supply said assisting field current.

8. The voltage regulating system as claimed in claim 6, wherein said means for supplying assisting current stops supplying said assisting current after said assisting period for a period longer than said assisting period.

9. The voltage regulating system as claimed in claim 4, wherein the resistor includes a first resistor connected in parallel with said clamp switch, for connecting said one of said plurality of output terminals and said lower-side terminal of said full-wave rectifier unit, the voltage regulating system further including a second resistor connected in series with said clamp switch between said one of said plurality of output terminals and said lower-side terminal of said full-wave rectifier unit, wherein the second resistor has a lower resistance than said first resistor.

10. The voltage regulating system as claimed in claim 5, wherein the resistor includes a first resistor connected in series with said clamp switch between said one of said plurality of output terminals and said lower-side terminal of said full-wave rectifier unit, the voltage regulating system further including a second resistor connected in parallel with said clamp switch, for connecting said one of said plurality of output terminals and said lower-side terminal of said full-wave rectifier unit, wherein the first resistor has a lower resistance than said second resistor.

* * * * *